United States Patent [19]

Imaseki et al.

[11] Patent Number: 4,953,654
[45] Date of Patent: Sep. 4, 1990

[54] VEHICULAR DIFFERENTIAL LIMITING TORQUE CONTROL SYSTEM

[75] Inventors: Takashi Imaseki; Yuji Kobari, both of Zushi, Japan

[73] Assignee: Nissan Motor Co., Ltd., Yokohama, Japan

[21] Appl. No.: 256,518

[22] Filed: Oct. 13, 1988

[30] Foreign Application Priority Data

Oct. 14, 1987 [JP] Japan .............................. 62-259038
Dec. 10, 1987 [JP] Japan .............................. 62-312489

[51] Int. Cl.$^5$ .................... B60K 23/04; B60K 31/00
[52] U.S. Cl. ................................ 180/197; 180/233; 180/248; 180/249; 364/426.03; 74/866
[58] Field of Search ............ 180/179, 233, 247, 248, 180/249; 74/710.5, 711; 364/426.01, 426.02, 426.03

[56] References Cited

U.S. PATENT DOCUMENTS

| | | | |
|---|---|---|---|
| 4,679,463 | 7/1987 | Ozaki et al. | 74/711 |
| 4,681,180 | 7/1987 | Oyama et al. | 180/76 |
| 4,741,407 | 5/1988 | Torii et al. | 180/248 X |
| 4,790,404 | 12/1988 | Naito | 180/197 |
| 4,830,132 | 5/1989 | Inagaki et al. | 180/197 |
| 4,841,808 | 6/1989 | Ouchi et al. | 180/249 X |

FOREIGN PATENT DOCUMENTS 61-102320 5/1986 Japan .
62-103227 5/1987 Japan .
62-241732 10/1987 Japan .

Primary Examiner—Mitchell J. Hill
Attorney, Agent, or Firm—Foley & Lardner, Schwartz, Jeffery, Schwaab, Mack, Blumenthal & Evans

[57] ABSTRACT

A differential limiting torque control system for a vehicle includes a differential limiting clutch provided in a differential, a sensing section including sensors such as an accelerator position sensor, and sensors for sensing speeds of left and right front wheels and left and right rear wheels, and a control unit controlling a differential limiting torque of the differential limiting clutch in accordance with an accelerator opening degree of movement, a left and right drive wheel speed difference, and a drive wheel slip which is represented, for example, by a front and rear wheel speed difference, in such a manner that the differential limiting torque is held equal to a difference obtained by subtraction whose subtrahend is a quantity proportional to the drive wheel slip, and whose minuend is a sum of a quantity proportional to the accelerator opening degree and a quantity proportional to the left and right drive wheel speed difference. The control unit may further control the differential limiting torque in accordance with a lateral acceleration in such a manner that the subtrahend is decreased with increase of the lateral acceleration.

12 Claims, 7 Drawing Sheets

VEHICULAR DIFFERENTIAL LIMITING TORQUE CONTROL SYSTEM

REFERENCES TO RELATED APPLICATIONS

The following, commonly assigned, U.S. applications relate to differential limiting systems. Ser. No. 07/247,466, filed on Sept. 21, 1988; Ser. No. 07/247,464, filed on Sept. 21, 1988; Ser. No. 07/267,602, filed on Nov. 7, 1988; Ser. No. 07/259,659, filed on Oct. 19, 1988; Ser. No. 07/251,169, filed on Sept. 28, 1988; and Ser. No. 07/255,934, filed on Oct. 11, 1988.

BACKGROUND OF THE INVENTION

The present invention relates to a differential limiting torque control system for controlling a differential (or slip) limiting torque (or force) of a limited slip differential.

Japanese patent provisional publication No. 62-103227 (Application No. 60-244677) discloses one conventional example. This conventional device employs a progressive characteristic of the differential limiting torque with respect to a left and right drive wheel speed difference in order to provide reliable control performance even in an abrupt one wheel slip state.

Japanese patent provisional publication No. 61-102320 (Application No. 59-223486) discloses another conventional example. In order to prevent an inside wheel from being stuck during a turn, this control system is arranged to decrease the differential limiting torque if the steering amount is large, the accelerator opening degree is great, and the friction coefficient of a road surface is high under the condition that the vehicle speed is equal to or lower than a predetermined speed value.

However, the former system is arranged to increase the differential limiting torque in proportion to the left and right wheel speed difference, and the latter system is arranged to increase the differential limiting torque in proportion to the accelerator opening degree. These conventional system use only the left and right drive wheel speed difference or the accelerator opening degree as a control parameter even when the yaw rate of the vehicle becomes so high as to incur spin of the vehicle. Therefore, these systems hold the differential limiting torque high, so that the possibility of vehicle spin is high.

SUMMARY OF THE INVENTION

It is therefore an object of the present invention to provide a differential limiting torque control system which can reduce the possibility of spin in all operating conditions, and facilitate drift control.

As shown in FIG. 1, a differential limiting torque control system according to the present invention comprises differential limiting clutch means 1, sensor means 2, and clutch control means 3.

The differential limiting clutch means 1 is provided between left and right drive wheels of the vehicle, for varying an actual differential limiting torque in response to a control signal. In the example shown in FIG. 1, the drive wheels are rear wheels of the vehicle. Preferably, the differential limiting torque is varied continuously.

The sensor means 2 comprises first sensing means 201 for sensing an accelerator opening degree, second sensing means 202 for sensing a left and right drive wheel speed difference, and third sensing means 203 for sensing a drive wheel slip, which is a front and rear wheel speed difference, for example.

The control means 3 produces the control signal to control the actual differential limiting torque in accordance with signals supplied from the sensor means. The control means 3 determines a final desired differential limiting torque T which is equal to a remainder resulting from subtraction of a second quantity from a first quantity. The first quantity is equal to a sum of a first differential limiting torque $T_1$ which is a variable increasing with increase of the left and right drive wheel speed difference, and a second differential limiting torque $T_2$ which is a variable increasing with increase of the accelerator opening degree. The second quantity is equal to a third differential limiting torque which is a variable increasing with increase of the drive wheel slip.

The sensor means 2 may further comprises fourth sensing means 204 for sensing a lateral acceleration of the vehicle, and the control means 3 may be arranged to decrease the third differential limiting torque as the lateral acceleration increases.

During a steady state turn of a large turning radius, the accelerator opening degree is small, the drive wheel slip is low, and the lateral acceleration is approximately constant, so that the influence of the left and right drive wheel speed difference becomes greatest. Therefore, the control system determines the final desired differential limiting torque mainly by the left and right drive wheel speed difference. When the driving force is increased by an increase of the accelerator opening degree, the control system prevents an increase of the left and right drive wheel speed difference by increasing the differential limiting torque. When the drive wheel slip is increased, the control system prevents an increase of the left and right drive wheel slip by decreasing the differential limiting torque. In this way, the control system of the present invention can reduce the possibility of spin.

During power slide, the left and right drive wheel speed difference is low, and the control system determines the differential limiting torque mainly by the accelerator opening degree. At the peak of a corner at which the accelerator pedal is depressed, the differential limiting torque is increased, and an inside wheel slip is restrained, so that the steer characteristic of the vehicle changes from understeer to oversteer (reverse steer characteristic), and the vehicle falls into a drift state. In this state, the control system facilitates the drift control by decreasing the differential limiting torque determined mainly by the accelerator opening degree, by an amount proportional to the drive wheel slip. As the drive wheel slip increases, the drive wheels lose their ability to grip the road surface, and the drift control becomes more difficult. Therefore, the control system prevents vehicle spin and ensures the ease of drift control by decreasing the differential limiting torque as the drive wheel slip increases.

DETAILED DESCRIPTION OF THE INVENTION

A first embodiment of the present invention is shown in FIGS. 2-6. In this embodiment, the invention is applied to a rear wheel drive vehicle having a differential equipped with a multiple disc friction clutch.

Figure 1:
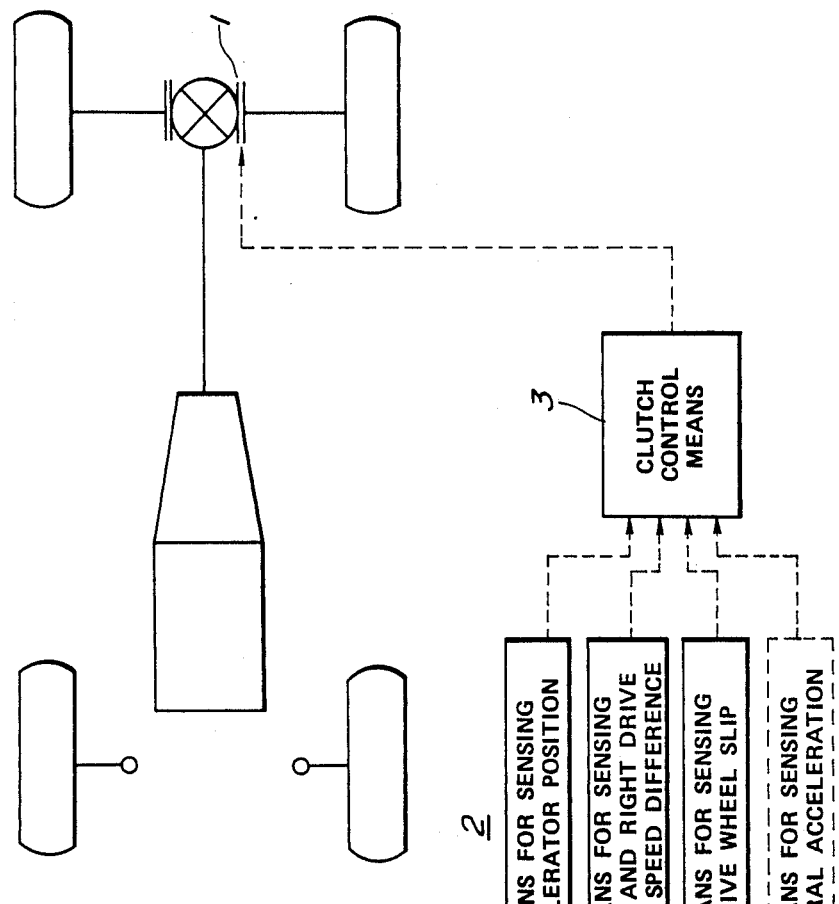
FIG. 1 is a schematic view showing a vehicular differential limiting torque control system of the present invention.
Figure 2:
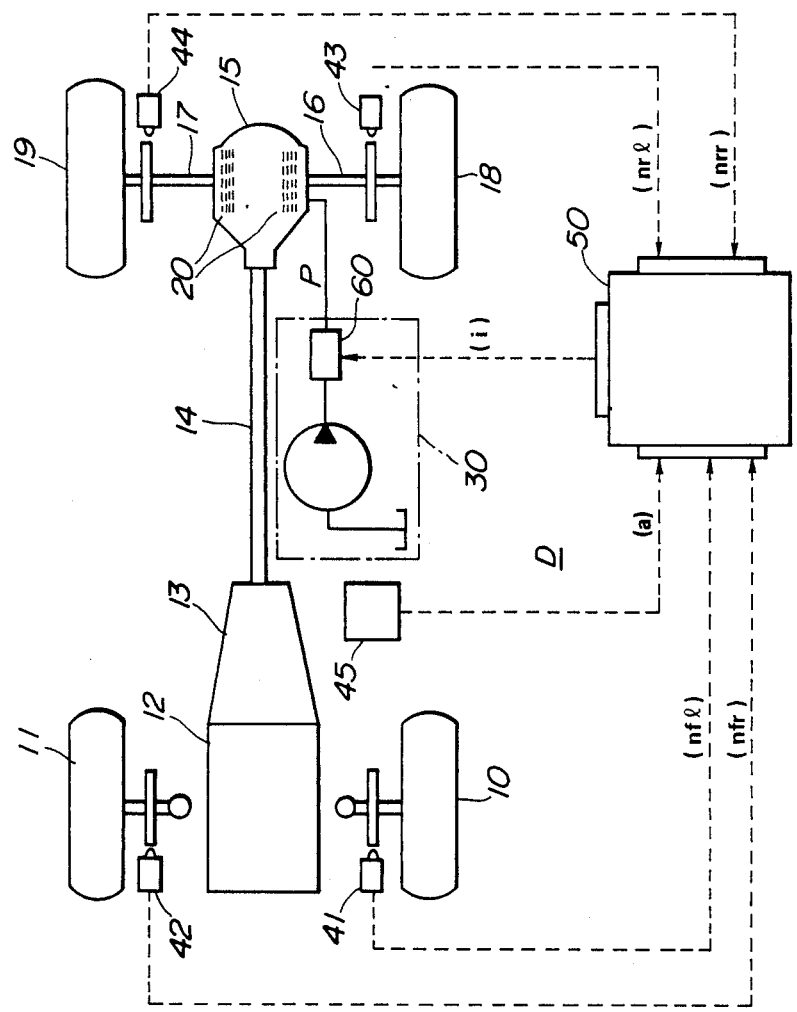
FIG. 2 is a schematic view of a vehicle equipped with a differential limiting torque control system, for showing first and second embodiments of the present invention.

As shown in FIG. 2, the rear wheel drive vehicle of this embodiment includes a front left wheel 10, a front right wheel 11, an engine 12, a transmission 13, a propeller shaft 14, a differential 15, a left drive shaft 16, a right drive shaft 17, a rear left wheel 18, and a rear right wheel 19.

The differential 15 is provided between the left and right rear wheels 18 and 19. The differential 15 is connected with the propeller shaft 14 for receiving driving torque, and connected with the left and right drive shafts 16 and 17 for delivering the driving torque to the left and right rear wheels 18 and 19. The differential 15 includes a multiple disc wet type friction clutch assembly (differential limiting clutch means) 20 provided between the propeller shaft 14 on the input side, and the left and right drive shafts 16 and 17 on the output side. The clutch assembly 20 is capable of limiting the differential action between the left and right rear wheels 18 and 19. The differential limiting (or slip limiting) clutch assembly 20 is engaged by the action of a control oil pressure P supplied from a pressure producing device 30. In this embodiment, the differential limiting clutch assembly 20 has left and right clutches. One example of such a differential limiting clutch assembly is disclosed in U.S. Pat. No. 4,679,463.

Figure 3:
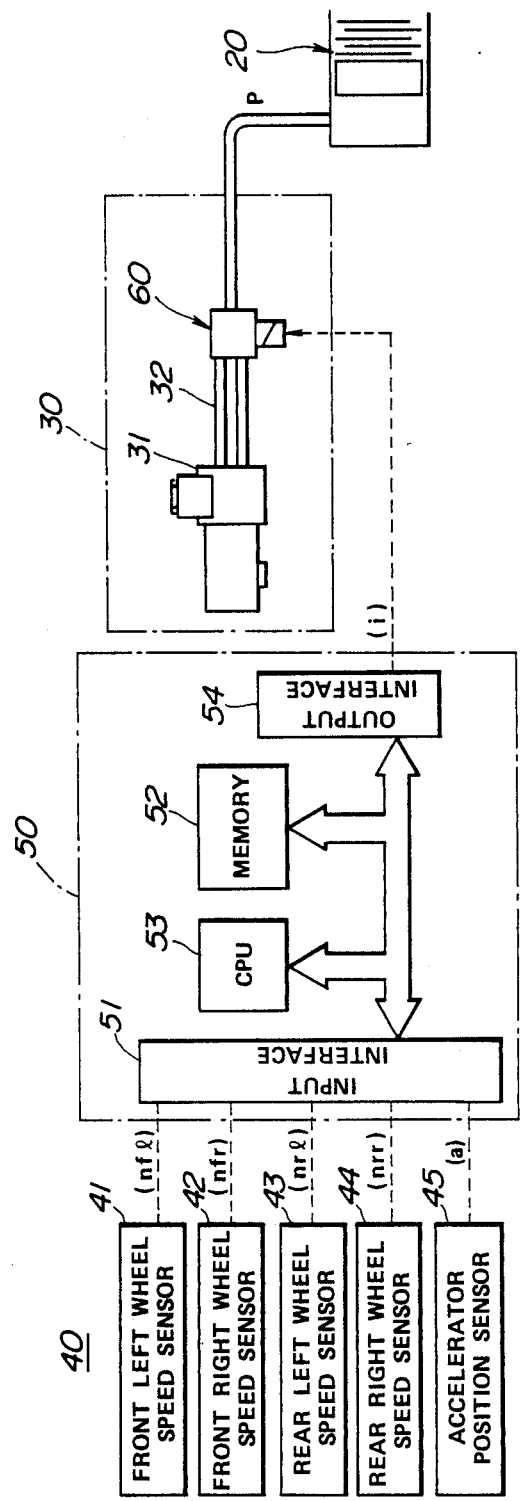
FIG. 3 is a schematic view of the differential limiting torque control system of FIG. 2, for showing the first and second embodiments.

As shown in FIG. 3, a differential control system D of this embodiment includes a sensor group 40, a control unit 50 serving as a control module, and an actuator comprising an electromagnetic proportional pressure reducing valve 60.

The sensor group 40 includes a front left wheel rotational speed sensor 41, a front right wheel rotational speed sensor 42, a rear left wheel rotational speed sensor 43, a rear right rotational speed sensor 44, and an accelerator position sensor 45.

The front wheel speed sensors 41 and 42 sense, respectively, the rotational speeds of the left and right front wheels 10 and 11 which are not driven by the engine 12. The front left wheel speed sensor 41 produces a front left wheel speed signal (nfl) representing the front left wheel rotational speed NFL, and the front right wheel speed sensor 42 produces a front right wheel speed signal (nfr) representing the front right wheel rotational speed NFR.

The rear wheel speed sensors 43 and 44 sense, respectively, the rotational speeds of the left and right rear wheels 18 and 19 which are driven by the engine 12. The rear left wheel speed sensor 43 produces a rear left wheel speed signal (nrl) representing the rear left wheel rotational speed NRL, and the rear right wheel speed sensor 44 produces a rear right wheel speed signal (nrr) representing the rear right wheel rotational speed NRR.

The accelerator position sensor 45 senses an opening degree A of an accelerator of the engine 12, and produces an accelerator opening signal (a) representing the accelerator opening degree A.

A main component of the control unit 50 of this embodiment is a microcomputer mounted on the vehicle. As shown in FIG. 3, the control unit 50 includes an input interface circuit 51, a memory section 52, a CPU (central processing unit) 53, and an output interface circuit 54.

Figure 4:
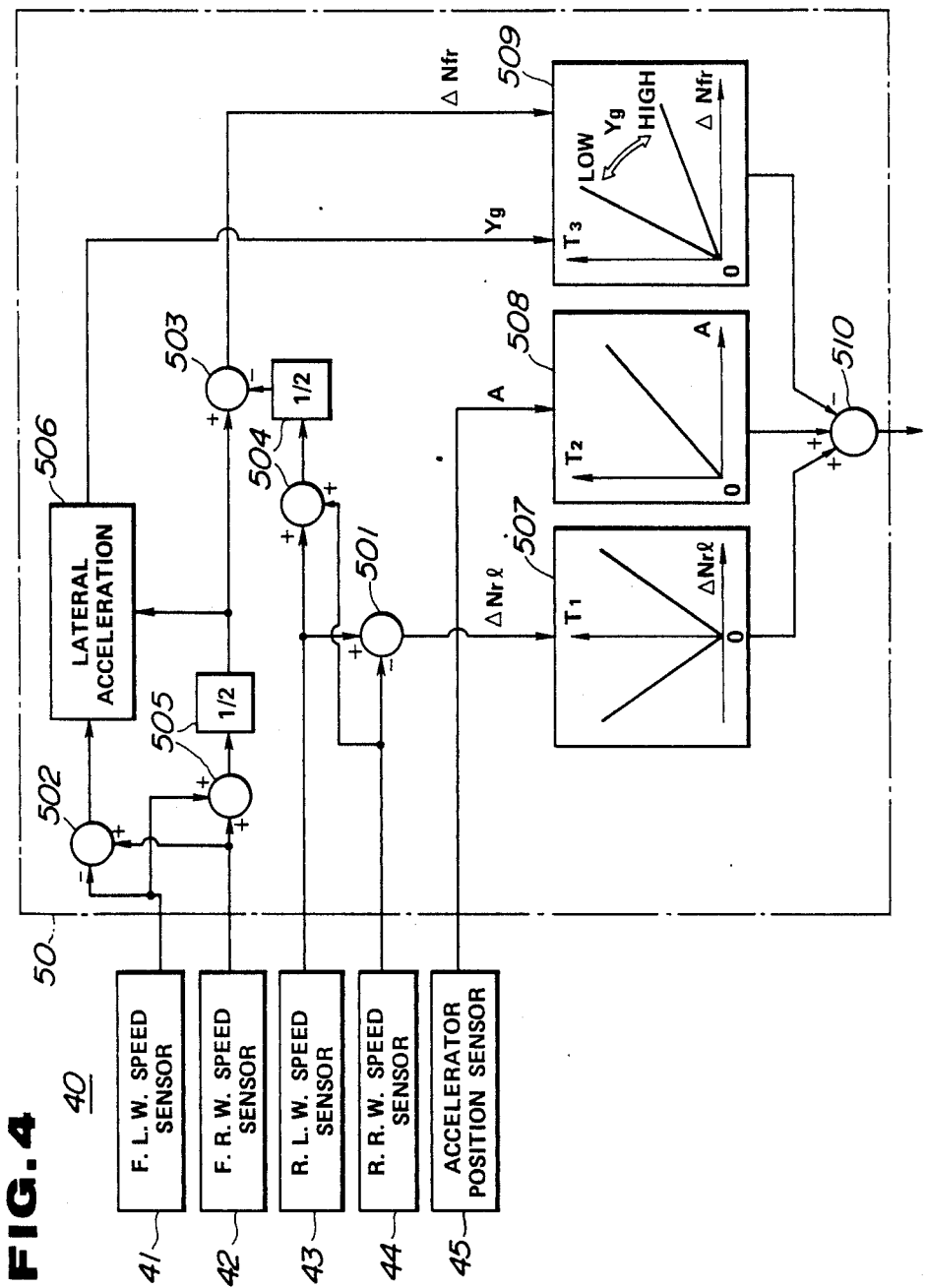
FIG. 4 is a block diagram of a control unit of the first embodiment.

The control unit 50 is further shown in the block diagram of FIG. 4. The control unit 50 of this embodiment includes three subtracters 501, 502 and 503, two average determining devices 504 and 505, a lateral acceleration determining section 506, three function generators 507, 508 and 509, and a summer 510. Each of the average determining devices 504 and 505 of this example is composed of an adder and a divider for dividing an input by 2.

The electromagnetic proportional pressure reducing valve 60 is provided in the pressure producing device 30. This valve 60 is a valve actuator for controlling a pump oil pressure supplied from a pump 31 through an oil passage 32 in response to a control current signal (i), and producing a control oil pressure P proportional to a command current valve i* of the control signal (i).

A relationship between the control pressure P and a differential limiting (slip limiting) torque T is given by;

$$T \alpha P.\mu.n.r.E$$

where n is the number of clutch plates, r is an average radius of the clutch, and E is an area receiving the pressure. Thus, the differential limiting torque T is proportional to the control oil pressure P.

Figure 5:
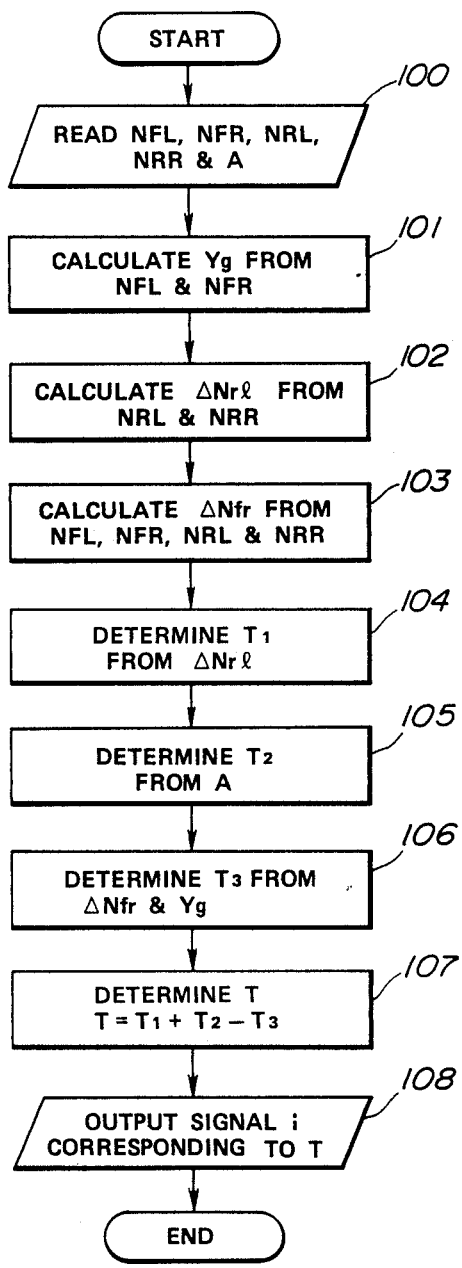
FIG. 5 is a flowchart of a control program performed by the control unit of the first embodiment.

The control system of this embodiment is operated as follows:

FIG. 5 shows a sequence of operations performed by the control unit 50.

At a step 100 of FIG. 5, the control unit 50 reads the front left wheel speed NFL, the front right wheel speed NFR, the rear left wheel speed NRL, the rear right wheel speed NRR, and the accelerator opening degree A, sensed by the sensors 41-45.

At a step 101, the control unit 50 calculates a lateral acceleration Yg by using the front left wheel speed NFL and the front right wheel speed NFR obtained by the step 100. In this embodiment, the control unit 50 determines the lateral acceleration Yg by using the following equations.

$$V = \{(NFL + NFR)/2\}/r$$

$$\psi = K1 \cdot |NFL - NFR|$$

$$\begin{aligned} R &= V/\psi \\ &= K2 \cdot |(NFL + NFR)/(NFL - NFR)| \end{aligned}$$

$$\begin{aligned} Yg &= V^2/R \\ &= K3 \cdot |(NFL + NFR) \times (NFL - NFR)| \end{aligned}$$

In these equations, R is a turning radius, V is a vehicle speed, $\psi$ is a yaw rate, K1, K2 and K3 are constants determined by the specifications of the vehicle, and r is a tire radius. In most conditions, the lateral acceleration can be considered equal to a centripetal acceleration.

At a step 102, the control unit 50 calculates a left and right drive wheel speed difference Nrl by using the rear left wheel speed difference NRL and the rear right wheel speed difference NRR. The left and right drive wheel speed difference ΔNrl is given by;

$$\Delta Nrl = NRL - NRR$$

At a step 103, the control unit 50 calculates a drive wheel slip by using the front left wheel speed NFL, the front right wheel speed NFR, the rear left wheel speed NRL and the rear right wheel speed NRR. In this embodiment, the drive wheel slip is set equal to a front and rear wheel speed difference ΔNfr, which is given by;

$$\Delta Nfr = \{(NRL+NRR)/2\} - \{(NFL+NFR)/2\}$$

At a step 104, the control unit 50 determines a first differential limiting torque $T_1$ which is proportional to the left and right drive wheel speed difference ΔNrl obtained at the step 102. As shown in a graph in a block of the function generator 507 in FIG. 4, the first differential limiting torque $T_1$ increases proportionally as the absolute value of the left and right drive wheel speed difference ΔNrl increases.

At a step 105, the control unit 50 determines a second differential limiting torque $T_2$ which is proportional to the accelerator opening degree A obtained at the step 100. As shown in a graph in a block of the function generator 508 of FIG. 4, the second differential limiting torque $T_2$ increases proportionally as the accelerator opening degree A increases.

At a step 106, the control unit 50 determines a third differential limiting torque $T_3$ which increases in direct proportion to the front and rear wheel speed difference ΔNfr obtained at the step 103, at a proportionality constant (proportional gain) which is in inverse proportion to the lateral acceleration Yg. The third differential limiting torque $T_3$ is equal to a product obtained by multiplying the front and rear wheel speed difference ΔNfr by the proportional gain which is in inverse proportion to the lateral acceleration Yg. As shown in a graph in a block of the function generator 509 of FIG. 4, the third differential limiting torque $T_3$ increases from zero proportionally with increase of the front and rear wheel speed difference ΔNfr from zero, at a rate which decreases as the lasteral acceleration Yg increases.

At a step 107, the control unit 50 determines a final differential limiting torque T from the first, second and third differential limiting torques $T_1$, $T_2$ and $T_3$. The final differential limiting torque T is expressed as;

$$T = T_1 + T_2 - T_3$$

Therefore, at least when Nrl and Nfr are both positive, $$T = (k_1 A + k_2 \Delta Nrl) - (k_3/Yg)\Delta Nfr$$

where $k_1$, $k_2$ and $k_3$ are positive constants.

At a step 108, the control unit 50 outputs the control current signal (i) having the current value i* by which the final differential limiting torque T can be achieved in the friction clutch assembly 20.

When the vehicle is in a steady state turning motion with a large turning radius, the lateral acceleration Yg is almost constant, the accelerator opening degree A is low, and the front and rear wheel speed difference ΔNfr due to the drive wheel slip is low. Therefore, the influence of the left and right drive wheel speed difference ΔNrl is predominant, and the final differential limiting torque T is determined predominantly by the first differential limiting torque $T_1$ based on the left and right drive wheel speed difference ΔNrl. The second differential limiting torque $T_2$ proportional to the accelerator opening degree A and the third differential limiting torque $T_3$ are both used to adjust the final differential limiting torque T in such a stable direction as to restrain an increase of the left and right drive wheel speed difference ΔNrl, so that the control system of this embodiment can reduce the possibility of spin in all road surface conditions and all vehicle operating conditions. When the driving force is increased by an increase of the accelerator opening degree A, then the control system of this embodiment prevents an increase of the left and right drive wheel speed difference ΔNrl by increasing the final differential limiting torque T ($T_1+T_2$). When the left and right drive wheels 18 and 19 lose their ability of gripping the road surface, and the drive wheel slip increases, then the control system of this embodiment prevents an increase of the left and right drive wheel speed difference ΔNrl by decreasing the final differential limiting torque T ($T_1-T_3$).

When the vehicle is in power slide driving in which the driver causes the vehicle to turn by depressing the accelerator pedal, and utilizing side slipping movement of the drive wheels 18 and 19, then the left and right drive wheel speed difference ΔNrl is low, so that the final differential limiting torque T is determined predominantly by the second differential limiting torque $T_2$ based on the accelerator opening degree A. At the apex of a corner at which the accelerator pedal is depressed, the differential limiting torque T increases, and the slip of the inside wheel is restrained, so that the characteristic of the vehicle changes from understeer to oversteer (reverse steer characteristic), and the vehicle falls into a drift state. In this drift state, the control system of this embodiment determines the final differential limiting torque T by subtracting the third differential limiting torque $T_3$ directly proportional to the front and rear wheel speed difference ΔNfr and inversely proportional to the lateral acceleration Yg, from the second differential limiting torque $T_2$ directly proportional to the accelerator opening degree A, so that this control system makes it easy to control the drift. This control system decreases the final differential limiting torque T as the drive wheel slip increase because the drift control becomes more difficult with increase of the drive wheel slip. However, it is desirable to permit the drive wheel slip to some extent during a turn of a small turning radius on a high friction coefficient μ(mu) road during which the lateral acceleration Yg is high, and it is necessary to exclude the influence of the drive wheel slip during a turn of a large turning radius on a low friction coefficient μ road surface during which the lateral acceleration Yg is low. Therefore, the control system of this embodiment employs the third differential limiting torque $T_3$ inversely proportional to the lateral acceleration Yg.

The clutch oil pressure can be controlled in various manners. For example, it is possible to employ a duty factor control system using a solenoid valve which opens and closes a fulid passage in response to a periodic pulse signal.

It is optional to employ an electromagnetic clutch or a clutch or brake of another type in place of the multiple disc friction clutch of this embodiment.

In this embodiment, the lateral acceleration Yg is calculated from NFL and NFR. However, it is possible to calculate the lateral acceleration Yg from a steering angle and a vehicle speed, or determine the lateral acceleration Yg by using a lateral acceleration sensor.

In this embodiment, the front and rear wheel speed difference is used as the drive wheel slip. However, it is optional to employ a drive wheel slip rate or a drive wheel slip ratio as the drive wheel slip.

A second embodiment of the present invention is shown in FIGS. 2,3,6 and 7. FIGS. 2 and 3 are common to the first and second embodiments. The second embodiment is different from the first embodiment in that the lateral acceleration Yg is not used.

A vehicle of a second embodiment is also a rear wheel drive vehicle, and has the same components as the vehicle of the first embodiment as shown in FIG. 2. The differential limiting control system D of the second embodiment also include the sensor group 40, the control unit 50 and the electromanetic proportional pressure reducing valve 60 for producing the control oil pressure P supplied to the differential limiting clutch assembly 20 of the rear differential 15. The sensor group 40 also includes the sensors 41–45, as shown in FIG. 3.

Figure 6:
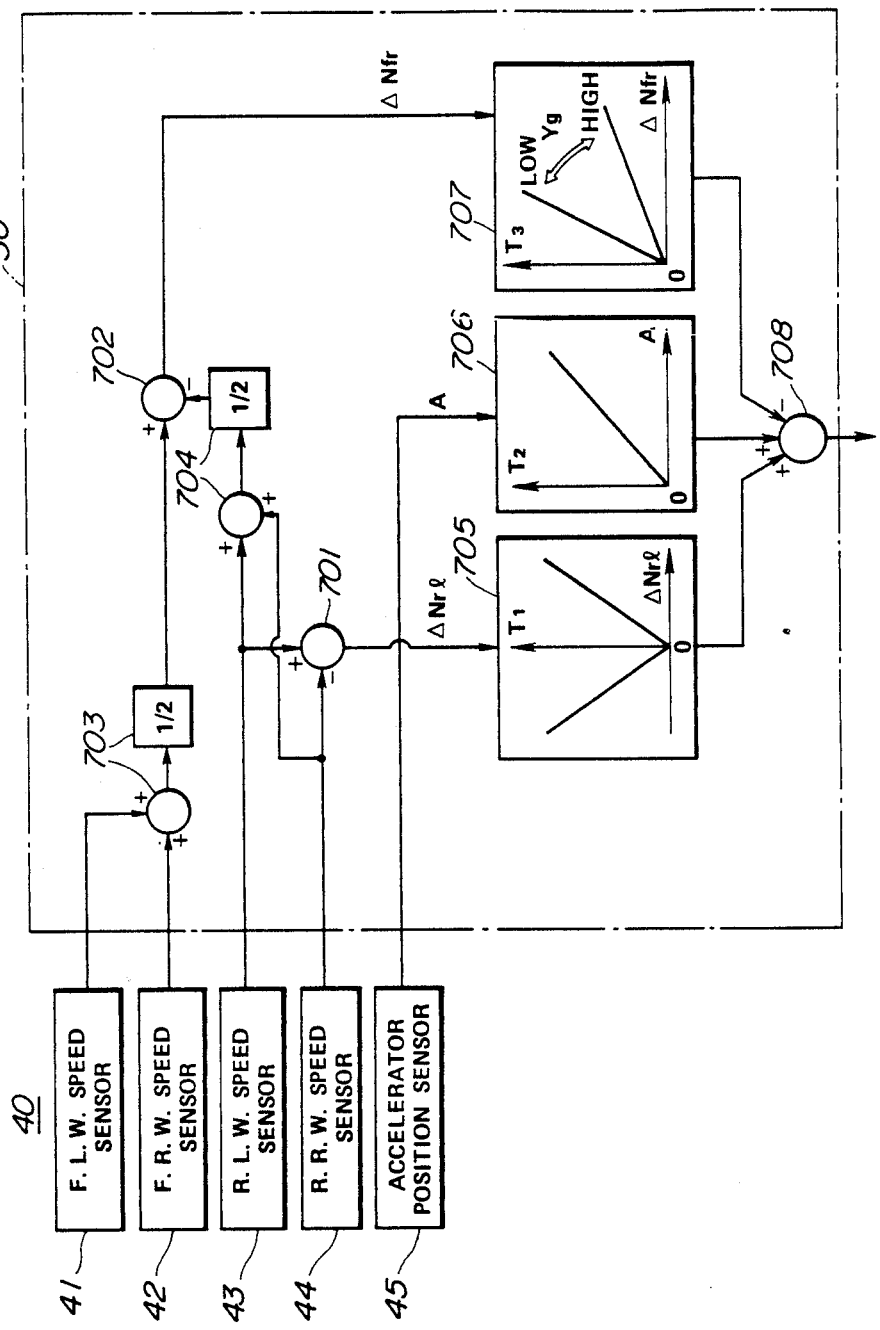
FIG. 6 is a block diagram of a control unit of the second embodiment.

As shown in FIG. 6, the control unit 50 of the second embodiment does not include a section for determining the lateral acceleration. The control unit 50 of the second embodiment includes two subtracters 701 and 702, two average determining devices 703 and 704, three function generators 705, 706 and 707, and a summer 708 for adding output signals of the function generators 705, 706 and 707 algebraically.

Figure 7:
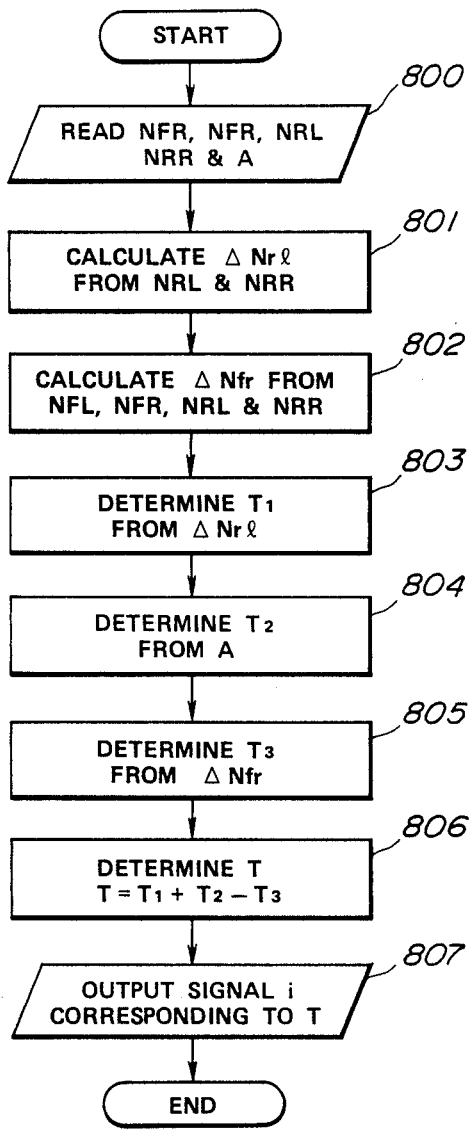
FIG. 7 is a flowchart of a program performed by the control unit of the second embodiment.

FIG. 7 is a flowchart showing a sequence of operations performed by the control unit 50 of the second embodiment. The flowchart of FIG. 7 is almost the same as the flowchart of the first embodiment shown in FIG. 5, but different in that, in FIG. 7, there is no step for calculating Yg.

A step 800 is substantially the same as the step 100 of FIG. 5. The control unit 50 of the second embodiment reads the front left wheel speed NFL, the front right wheel speed NFR, the rear left wheel speed NRL, the rear right wheel speed NRR and the accelerator opening degree A which are sensed by the sensors 41–45.

A step 801 is substantially the same as the step 102. The control unit 50 determines the left and right drive wheel speed difference $\Delta Nrl$ (=NRL−NRR).

A step 802 is substantially the same as the step 103. The control unit 50 of the second embodiment determines the drive wheel slip which is set equal to the front and rear wheel speed difference $\Delta Nfr$. The front and rear wheel speed difference $\Delta Nfr$ is determined by subtracting an average of NFL and NFR from an average of NRL and NRR.

A step 803 is substantially the same as the step 104. The control unit 50 of the second embodiment determines the first differential limiting torque $T_1$ by multiplying the absolute value of the left and right drive wheel speed difference $\Delta Nrl$ by a predetermined positive constant.

A step 804 is substantially the same as the step 105. The control unit 50 determines the second differential limiting torque $T_2$ by multiplying the accelerator opening degree A by a predetermined positive constant.

At a step 805, the control unit 50 of the second embodiment determines the third differential limiting torque $T_3$ from the front and rear wheel speed difference Nfr. The third differential limiting torque $T_3$ is determined by multiplying the front and rear wheel speed difference $\Delta Nfr$ by a gain which is a predetermined positive constant in the second embodiment.

A step 806 is substantially the same as the step 107. The final differential limiting torque T is determined by subtracting a second component which is the third differential limiting torque $T_3$ from a first component which is a sum of the first and second differential limiting torques $T_1$ and $T_2$.

At a step 807, the control unit 50 delivers the control signal (i) corresponding to the final differential limiting torque T, to the valve 60.

During a steady state turn of a large turning radius, the accelerator opening degree A is low, and the front and rear wheel speed difference $\Delta Nrl$ due to the drive wheel slip is low, so that the influence of the left and right drive wheel speed difference $\Delta Nrl$ prevails, and the final differential limiting torque T is determined mainly by the first differential limiting torque $T_1$, based on the left and right drive wheel speed difference $\Delta Nrl$. The control system of the second embodiment reduces the possibility of spin by adjusting the final differential limiting torque T with the addition of the second differential limiting torque $T_2$ proportional to the accelerator opening degree A to the first differential limiting torque $T_1$, and with the subtraction of the third differential limiting torque $T_3$ proportional to the front and rear wheel speed difference $\Delta Nfr$ in the same manner as in the first embodiment.

During a turn using power slide, the left and right drive wheel speed difference $\Delta Nrl$ is small, and accordingly the final differential limiting torque T is determined mainly by the second differential limiting torque $T_2$ proportional to the accelerator opening degree A. The control system of the second embodiment also facilitates the drift control by subtracting the third differential limiting torque $T_3$ proportional to the front and rear wheel speed difference Nfr from the second differential limiting torque $T_2$ proportional to the accelerator opening degree A. As the drive wheel slip increases, the drive wheels lose their ability of gripping the road surface, and the drift control becomes more difficult. Therefore, the control system restrains the vehicle spin, and ensures the ease of the drift control by decreasing the differential limiting torque in proportion to the drive wheel slip.

In this way, the differential limiting torque control system of the present invention can reduce the possibility of spin in all road surface conditions and operating conditions, and facilitate the drift control.

What is claimed is:

1. A differential limiting torque control system for a vehicle, comprising:
    differential limiting clutch means provided between left and right drive wheels of the vehicle for varying an actual differential limiting torque in response to a control signal,
    sensor means comprising first sensing means for sensing a throttle opening degree of the vehicle, second sensing means for sensing a left and right drive wheel speed difference, and third sensing means for sensing a drive wheel slip, and
    control means for producing said control signal to control said actual differential limiting torque in accordance with signals sent from said sensor means, said control means comprising first function generating means connected with said second sensing means for producing a first limiting torque signal representing a first differential limiting torque which increases as said left and right drive wheel speed difference increases, second function generating means connected with said first sensing means for producing a second limiting torque signal representing a second differential limiting torque which increases as said throttle opening degree increases, third function generating means connected with said third sensing means for producing a third limiting torque signal representing a third differential limiting torque which increases as said drive wheel slip increases, and summing means connected with said first, second and third function generating means for producing said control signal representing a final desired differential limiting torque which is equal to a remainder resulting from subtraction of said third differential limiting torque from a sum of said first and second differential limiting torques.

2. A control system according to claim 1 wherein said first differential limiting torque is proportional to said left and right drive wheel speed difference, said second differential limiting torque is proportional to said accelerator opening degree, and said third differential limiting torque is proportional to said drive wheel slip.

3. A control system according to claim 1 wherein said sensor means further comprises fourth sensing means for sensing a lateral acceleration of the vehicle, and said control means determines said third differential limiting torque so that said third differential limiting torque increases as said drive wheel slip increases, and decreases as said lateral acceleration increases.

4. A control system according to claim 3 wherein said third differential limiting torque is directly proportional to said drive wheel slip, and inversely proportional to said lateral acceleration.

5. A control system according to claim 1 wherein said first function generating means includes means for determining said first differential limiting torque by multiplying said left and right drive wheel speed difference by a predetermined first constant, said second function generating means includes means for determining said second differential limiting torque by multiplying said throttle opening degree by a predetermined second constant, and said third function generating means includes means for determining said third differential limiting torque by multiplying said drive wheel slip by a predetermined proportional gain.

6. A control system according to claim 5 wherein said sensor means further comprises fourth sensing means for sensing a lateral acceleration of the vehicle, and said third function generating means of said control means decreases said proportional gain as said lateral acceleration increases.

7. A control system according to claim 5 wherein said proportional gain used by said third function generating means of said control means is constant.

8. A control system according to claim 5 wherein said drive wheels are rear wheels of the vehicle.

9. A control system according to claim 8 wherein said third sensing means comprises subtracting means for determining said drive wheel slip which is a difference resulting from subtraction of a front wheel rotational speed from a rear wheel rotational speed.

10. A control system according to claim 9 wherein said sensor means comprises a front left wheel speed sensor for sensing a front left wheel speed, a front right wheel speed sensor for sensing a front right wheel speed, a rear left wheel speed sensor for sensing a rear left wheel speed, a rear right wheel speed sensor for sensing a rear right wheel speed, and an accelerator position sensor for sensing said accelerator opening degree.

11. A control system according to claim 10 wherein said third sensing means comprises first averaging means for determining said front wheel rotational speed which is an average of said front left wheel speed and said front right wheel speed, and second averaging means for determining said rear wheel rotational speed which is an average of said rear left wheel speed and said rear right wheel speed.

12. A control system according to claim 11 wherein said sensor means further comprises fourth sensing means connected with said front left wheel speed sensor and said front right wheel speed sensor for calculating a lateral acceleration of the vehicle from said front left wheel speed and said front right wheel speed, and said third function generating means of said controller means decreases said proportional gain as said lateral acceleration increases.

* * * * *